United States Patent
Lee et al.

(10) Patent No.: US 9,110,214 B2
(45) Date of Patent: Aug. 18, 2015

(54) BACKLIGHT ASSEMBLY AND DISPLAY DEVICE HAVING THE SAME

(71) Applicant: Samsung Display Co., Ltd., Yongin, Gyeonggi-do (KR)

(72) Inventors: Ki-Chang Lee, Ansan-si (KR); Jong-Myeong Park, Ansan-si (KR); Chung-Hui Lee, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 226 days.

(21) Appl. No.: 13/659,332

(22) Filed: Oct. 24, 2012

(65) Prior Publication Data

US 2014/0022822 A1  Jan. 23, 2014

(30) Foreign Application Priority Data

Jul. 17, 2012  (KR) ........................ 10-2012-0077955

(51) Int. Cl.
| | |
|---|---|
| *G09F 13/04* | (2006.01) |
| *F21V 8/00* | (2006.01) |
| *G09F 9/35* | (2006.01) |
| *G09F 13/18* | (2006.01) |
| *G09F 13/22* | (2006.01) |

(Continued)

(52) U.S. Cl.
CPC ........ *G02B 6/0088* (2013.01); *G02F 1/133308* (2013.01); *G09F 9/35* (2013.01); *G09F 13/18* (2013.01); *G09F 13/22* (2013.01); *G02B 6/009* (2013.01); *G02B 6/0068* (2013.01); *G02B 6/0093* (2013.01); *G02F 1/133615* (2013.01); *G02F 2001/133317* (2013.01); *G02F 2001/133322* (2013.01); *G02F 2001/133325* (2013.01); *G02F 2001/133328* (2013.01); *G02F 2201/465* (2013.01)

(58) Field of Classification Search
CPC .... G09F 13/18; G09F 13/22; G02F 1/133308
USPC ......................................................... 362/613
See application file for complete search history.

(56) References Cited

U.S. PATENT DOCUMENTS

| | | | | |
|---|---|---|---|---|
| 5,842,297 | A * | 12/1998 | Tung | 40/546 |
| 6,530,164 | B2 * | 3/2003 | Gai | 40/546 |
| 6,847,417 | B2 * | 1/2005 | Kim | 349/58 |

(Continued)

FOREIGN PATENT DOCUMENTS

| | | |
|---|---|---|
| KR | 1998-0059739 | 11/1998 |
| KR | 2003-297125 | 10/2003 |
| KR | 2004-0003094 | 1/2004 |

*Primary Examiner* — Elmito Breval
(74) *Attorney, Agent, or Firm* — F. Chau & Associates, LLC

(57) ABSTRACT

A backlight assembly includes an optical member, a receiving container and a combining member. The optical member is configured to change optical characteristics of light. The receiving container includes a bottom plate and a sidewall. The bottom plate is disposed under the optical member and is configured to receive the optical member thereon. The sidewall extends from the bottom plate to form a receiving space with the bottom plate. The optical member is received in the receiving space. The combining member includes a first frame, a second frame and a third frame. The first frame partially covers a bottom surface of the optical member. The second frame protrudes upwards from the first frame. The third frame protrudes from an inner surface of the second frame to partially cover an upper surface of the optical member.

28 Claims, 4 Drawing Sheets

(51) Int. Cl.
*G02F 1/1333* (2006.01)
*G02F 1/1335* (2006.01)

(56) References Cited

U.S. PATENT DOCUMENTS

| | | | |
|---|---|---|---|
| 6,919,937 B2 * | 7/2005 | Kim et al. | 349/58 |
| 7,543,976 B2 * | 6/2009 | Abogabir | 362/633 |
| 2010/0315575 A1 * | 12/2010 | Chang et al. | 349/62 |
| 2011/0069255 A1 | 3/2011 | Choi et al. | |
| 2011/0170034 A1 * | 7/2011 | Jeong | 349/61 |
| 2011/0216556 A1 * | 9/2011 | Cho et al. | 362/612 |
| 2011/0273642 A1 * | 11/2011 | Kweon et al. | 349/62 |
| 2011/0286241 A1 * | 11/2011 | Pan et al. | 362/607 |
| 2011/0304794 A1 * | 12/2011 | Noh et al. | 349/62 |

* cited by examiner

BACKLIGHT ASSEMBLY AND DISPLAY DEVICE HAVING THE SAME

CROSS-REFERENCE TO RELATED APPLICATION

This application claims priority to Korean Patent Application No. 10-2012-0077955, filed on Jul. 17, 2012, the disclosure of which is hereby incorporated by reference herein in its entirety.

1. TECHNICAL FIELD

Example embodiments of the present invention relate to a backlight assembly and a display apparatus having the backlight assembly. More particularly, example embodiments of the present invention relate to a backlight assembly and a display apparatus having the same to make a combination of components simple.

2. DISCUSSION OF THE RELATED ART

Due to the fact that a liquid crystal display apparatus may have a thin thickness, a light weight and a low power consumption, liquid crystal display apparatuses have been used for a broad range of devices such as, for example, a monitor, a laptop computer, a cellular phone and so on. A liquid crystal display apparatus may display an image by changing the disposition of a liquid crystal having electrical and optical characteristics via an electrical field. As a result, the light transmittance of the liquid crystal display apparatus is changed by the change in disposition of the liquid crystal. To display the image, the liquid crystal display apparatus includes a display panel and a backlight assembly, and the display panel controls the liquid crystal and the backlight assembly provides light to the liquid crystal.

The liquid crystal display apparatus comprises a variety of parts such as, for example, a lamp assembly to generate light, a light guide plate to change an optical distribution of light generated from the lamp assembly, a reflector to make leaked light from the light guide plate be incident, and an optical sheet to increase optical characteristics of light emitted from the light guide plate. Furthermore, the backlight assembly may also include, for example, a metal bottom chassis, a synthetic resin-receiving container, and a panel guide member. The metal bottom chassis receives the lamp assembly, the light guide plate, the reflector and the optical sheet, and a synthetic resin-receiving container is combined with the bottom chassis. In addition, the panel guide member fixes the display panel to prevent the display panel from separating from the receiving container.

In addition, the liquid crystal display apparatus further includes, for example, a top chassis, a display panel, a mold frame, a middle chassis, and a light guide plate fixture. The light guide plate is fixed and received in the bottom chassis by the light guide plate fixture, and the mold frame formed to guide edges of the light guide plate is located on the light guide plate, and the optical sheet is laminated with the light guide plate and the display panel is disposed on the light guide plate in this order.

However, the number of assembly processes may significantly increase because the liquid crystal display apparatus is separately combined with the light guide plate and the light guide plate fixture, the receiving container and the mold frame, or the middle chassis, the display panel and the panel guide member. In addition, the number of the assembly processes may result in an increase in assembly time. Also, by having a greater number of assembled parts, the production process may be more complex and the manufacturing costs may be also increased.

SUMMARY OF THE INVENTION

Example embodiments of the present invention provide a backlight assembly and a display apparatus having the backlight assembly decreasing the number of total assembled parts and simplifying a combination of components so that the backlight assembly and the display apparatus may decrease the number of the assembly processes and also decrease assembly time.

In an example embodiment according to the present invention, a backlight assembly includes an optical member, a receiving container, and combining member. The optical member is configured to change optical characteristics of light. The receiving container includes a bottom plate and a sidewall. The bottom plate is disposed under the optical member to receive the optical member thereon. The sidewall extends from the bottom plate to form a receiving space with the bottom plate. The optical member is received in the receiving space. The combining member includes a first frame, a second frame and a third frame. The first frame partially covers a bottom surface of the optical member. The second frame protrudes upwards from the first frame. The third frame protrudes from an inner surface of the second frame to partially cover an upper surface of the optical member.

In an example embodiment, the combining member may further comprise a fourth frame protruding from the outer surface of the second frame to be combined with the sidewall of the receiving container, and the outer surface of the second frame is opposite to the inner surface of the second frame.

In an example embodiment, the sidewall of the receiving container may comprise a boss and the fourth frame of the combining member may include a recess, and the recess is combined with the boss of the sidewall of the receiving container.

In an example embodiment, the fourth frame may protrude from the outer surface of the second frame and may bend downwards to be substantially parallel with the second frame.

In an example embodiment, the optical member may be disposed in a first space between the first frame and the third frame, and the sidewall of the receiving container may be disposed in a second space between the second frame and the fourth frame.

In an example embodiment, the backlight assembly may further comprise at least one optical sheet disposed on the optical member.

In an example embodiment, the optical sheet may be disposed on the upper surface of the third frame.

In an example embodiment, an upper surface of the first frame may have greater size than a size of the upper surface of the third frame when viewed in a plan view.

In an example embodiment, the backlight assembly may further comprise a plurality of the combining members disposed around edges of the optical member.

In an example embodiment, part of the sidewall of the receiving container may be chamfered, and the chamfered part of the sidewall of the receiving container is located in a corner area of the receiving container.

In an example embodiment, a portion of the sidewall of the receiving container may recess toward the receiving space, and the portion of the sidewall of the receiving container is combined with the combining member.

In an example embodiment, the backlight assembly may further comprise a light source module including a plurality of incident light sources, and the light source module is disposed on a side of the optical member.

In an example embodiment according to the present invention, a display apparatus includes a display panel, an optical member, a receiving container, and a combining member. The display panel is configured to display an image. The optical member is configured to change optical characteristics of light provided to the display panel. The receiving container includes the bottom plate and the sidewall. The bottom plate is disposed under the optical member to receive the optical member thereon. The sidewall extends from the bottom plate to form a receiving space with the bottom plate. The optical member is received in the receiving space. The combining member includes a first frame, a second frame and a third frame. The first frame partially covers a bottom surface of the optical member. The second frame protrudes upwards from the first frame. The third frame protrudes from the inner surface of the second frame to partially cover an upper surface of the optical member.

In an example embodiment, the display apparatus may further comprise a fourth frame protruding from the outer surface of the second frame to be combined with the sidewall of the receiving container, and the outer surface of the second frame is opposite to the inner surface of the second frame.

In an example embodiment, the sidewall of the receiving container may comprise a boss and the fourth frame of the combining member may include a recess, and the recess is combined with the boss of the sidewall of the receiving container.

In an example embodiment, the fourth frame may protrude from the outer surface of the second frame and may bend downwards to be substantially parallel with the second frame.

In an example embodiment, the optical member may be disposed in a first space between the first frame and the third frame, and the sidewall of the receiving container may be disposed in a second space between the second frame and the fourth frame.

In an example embodiment, the display apparatus may further comprise at least one optical sheet disposed on the optical member.

In an example embodiment, the optical sheet may be disposed on an upper surface of the third frame.

In an example embodiment, an upper surface of the first frame may have a greater size than a size of the upper surface of the third frame when viewed in a plan view. In an exemplary embodiment, a display apparatus is provided. The display apparatus includes an optical member having a light incident surface and is configured to change optical characteristics of light, an optical sheet disposed on an upper surface of the optical member, a display panel configured to display an image and disposed on an upper surface of the optical sheet. The display panel includes an upper substrate, a lower substrate opposite to the upper substrate and a liquid crystal layer disposed between the lower substrate and the upper substrate.

In addition, the display apparatus further includes a receiving container including a bottom plate disposed under the optical member and configured to receive the optical member thereon and a sidewall extending from the bottom plate to form a receiving space with the bottom plate, and the optical member is received in the receiving space.

Also, the display apparatus further includes a combining member including a first frame, a second frame, a third frame and a fourth frame. The second frame protrudes upwards from the first frame. The third frame protrudes from an inner surface of the second frame to partially overlap with an upper surface of the first frame to thereby define a first space between an upper surface of the first frame and a lower surface of the third frame. The optical member is received in the first space and the third frame partially covers the optical member disposed in the first space. The fourth frame protrudes from an outer surface of the second frame and bends downward to be substantially parallel with the second frame to thereby define a second space between the outer surface of the second frame and an inner surface of the fourth frame. The sidewall of the receiving container is received in the second space. The fourth frame includes a recess disposed in an outside wall of the fourth frame substantially parallel with the sidewall of the receiving container and the recess is configured to be combined with the sidewall of the receiving container, and the outer surface of the second frame is opposite to the inner surface of the second frame.

The display apparatus further includes a light source module including a supporting substrate and a plurality of incident light sources disposed on the supporting substrate, and the light source module is disposed on a side of the optical member.

BRIEF DESCRIPTION OF THE DRAWINGS

Example embodiments of the present invention can be understood in more detail from the following detailed description taken in conjunction with the accompanying drawings, in which.

DETAILED DESCRIPTION OF EXAMPLE EMBODIMENTS OF THE INVENTION

Figure 1:
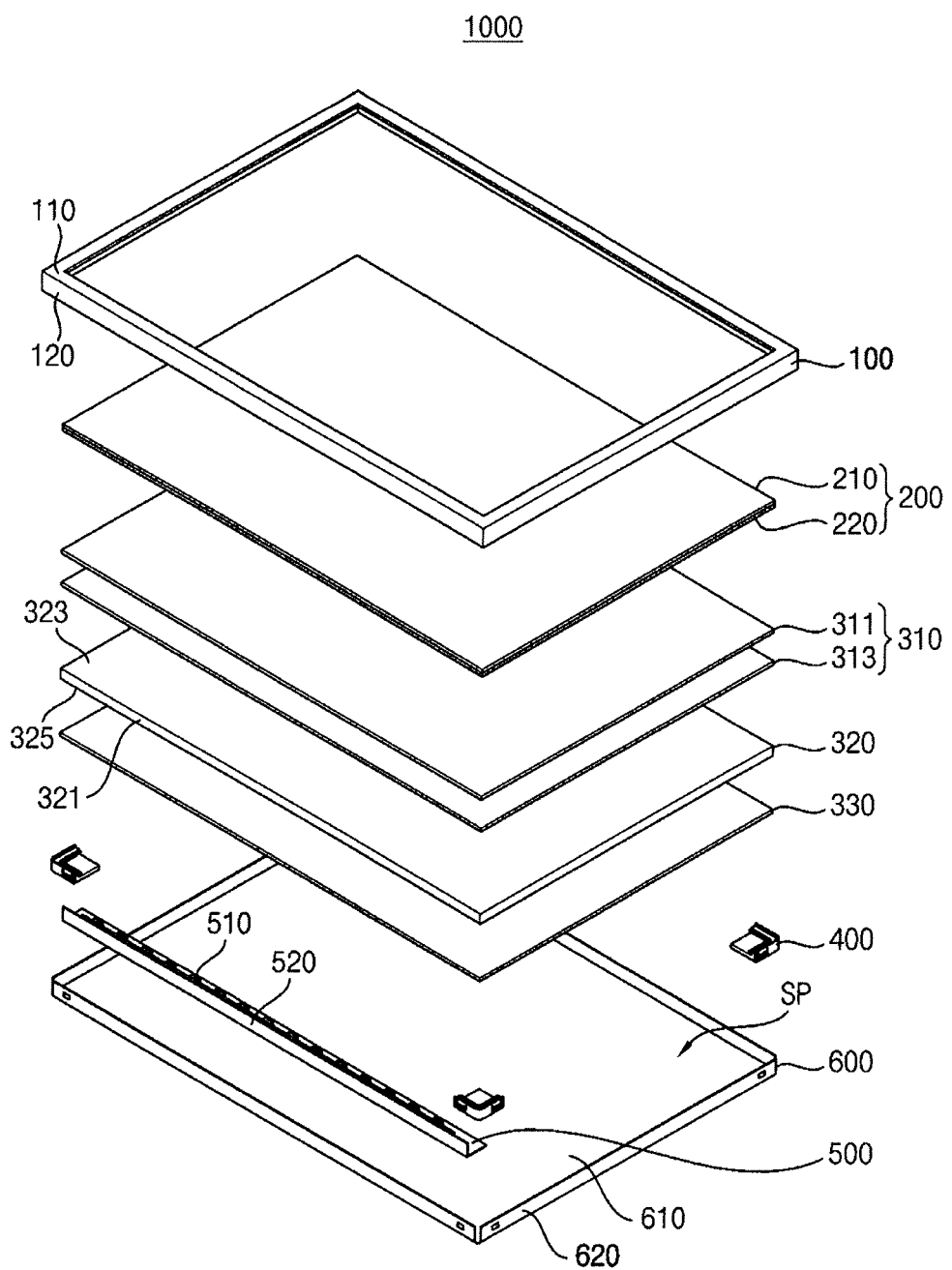
FIG. 1 is an exploded perspective view illustrating a display apparatus according to an example embodiment of the present invention.

Hereinafter, example embodiments of the present invention will be described in further detail with reference to the accompanying drawings.

In the drawings, the thicknesses of elements and regions may be exaggerated for clarity. It is to be noted that when an element is referred to as being "on" another element, it can be directly formed on the other element or can be formed on the other element with an intervening element or elements interposed therebetween. Like constituent elements are denoted by like reference numerals throughout the specification.

As used herein, the singular forms "a," "an" and "the" are intended to include the plural forms as well, unless the context clearly indicates otherwise.

FIG. 1 is an exploded perspective view illustrating a display apparatus according to an example embodiment of the present invention.

Referring to FIG. 1, the display apparatus 1000 according to the present example embodiment includes, for example, a top chassis 100, a display panel 200, an optical sheet 310, an optical member 320, a combining member 400, a light source module 500, and a receiving container 600.

The top chassis 100 is disposed on the display panel 200 and is combined with the receiving container 600. The top chassis 100 has, for example, a rectangular frame shape, and the rectangular frame shape forms an opening part exposing a display area of the display panel 200. The top chassis 100 may include, for example, a top cover 110 and a side cover 120. The top cover 110 covers edges of the display area and the side cover 120 vertically extends to the top cover 110. A configuration of the top chassis 100 is an example and, in addition to the top chassis 100, the display apparatus 1000 may be combined with a front cover or a molding part.

The top chassis 100 may be made of, for example, a metal material with high thermal conductivity to dissipate the heat transferred from the light source module 500. For example, in an exemplary embodiment, the top chassis 100 is made of highly thermal conductive material such as aluminum (Al), Stainless Steel or Steel, Electrogalvanized, Cold Rolled, Coil (SECC).

The display panel 200 includes, for example, an upper substrate 210, a lower substrate 220 opposite to the upper substrate 210, and a liquid crystal layer disposed between the upper substrate 210 and the lower substrate 220. The display panel 200 is disposed on the optical sheet 310 and the optical member 320, and displays an image by using light provided from the optical member 320.

The optical sheet 310 is disposed on the optical member 320 and increases the optical characteristics of light emitted from the optical member 320. For example, the optical sheet 310 includes a prism sheet 311 and a diffusion sheet 313, and vertically converts or diffuses light emitted from the optical member 320, so luminance characteristics of the display apparatus 1000 may be increased. However, exemplary embodiments of the present invention are not limited to the above configuration for the optical sheet 310. For example, in an exemplary embodiment, the optical sheet 310 may further include a protective sheet disposed on the prism sheet 311 to protect a surface of the prism sheet 311 from damage, e.g., scratches and foreign materials (e.g. dust), and diffuse the light to provide a uniform distribution of light. Moreover, in example embodiments, the prism sheet 311 may include, for example, two prism sheets.

The optical member 320 is disposed under the display panel 200 and provides light to the display panel 200. The optical member 320 may be composed of, for example, a light guide plate. The optical member 320 acts as an optical waveguide to emit light in the direction of the display panel 200, and the light is generated from the light source module 500 disposed on one side of the optical member 320. When a light incident into a light incident surface 321 of the optical member 320 arrives at the upper surface 323 or the bottom surface 325 of the optical member 320 at an angle of more then a critical angle, the light is totally internally reflected within the optical member 320, and not emitted to the outside. Here, the optical member 320 may have, for example, a plate shape and may include acrylic resins such as, for example, polymethyl methacrylate ("PMMA"), polymethylstyrene or polycarbonate ("PC") as a transparent plastic-like substance.

A reflective sheet 330 is disposed under the optical member 320 and reflects the light emitted from the optical member 320 back to the optical member 320. The reflective sheet 330 may be formed of, for example, a transparent resin. For example, in an exemplary embodiment, the reflective sheet 330 may be formed of polymethyl methacrylate ("PMMA"), polycarbonate ("PC"), polyethylene terephthalate ("PET"), etc.

The combining member 400 guides edges of the display panel 200 and the optical member 320, and fixes to the receiving container 600. For example, the combining member 400 may have a recess to be combined with a sidewall 620 of the receiving container 600, or be attached with the receiving container 600 using a double-sided tape. The combining member 400 is explained in detail referring to FIG. 2A and FIG. 2B.

The light source module 500 includes, for example, a plurality of incident light sources 510 and a supporting substrate 520. The light source module 500 including the light sources 510 and the supporting substrate 520 on which the light sources 510 are mounted is disposed on the side of the optical member 320. The light sources 510 may include, for example, a light emitting diode ("LED") generating light from outside of a driving voltage using characteristics of a semiconductor. The light emitting diode generates a one-way directional light in the form of points. In order words, the light emitting diode generates a light approximately spread from an arbitrary point. In addition, the light sources 510 may include, for example, at least one red LED emitting a red light, at least one green LED emitting a green light, and at least one blue LED emitting a blue light. The red light, the green light, and the blue light respectively emitted from the red LED, the green LED, and the blue LED are mixed and provided to the light guide plate as a white light. The number of the light sources 510 may be varied according to intended brightness.

The plurality of incident light sources 510 are mounted on the supporting substrate 520 opposite to the light incident surface 321 of the optical member 320. The supporting substrate 520 has, for example, a bar shape, and may consist of, for example, a LED driving printed circuit board ("PCB") formed by a circuit pattern electrically connecting and inserting a driving current. For example, the printed circuit board includes a base plate, a circuit pattern and an insulating layer, and the circuit pattern consists of a conductive material patterned to input the driving current to the plurality of LED on the base plate and the insulating layer to prevent a short circuit in the circuit pattern. The base plate may be, for example, a rigid plate or a ductile film material according to a desired thickness and ductility.

The receiving container 600 is a bottom chassis combined with the top chassis 100. The receiving container 600 is disposed under the optical member 320 and includes, for example, a bottom plate 610 and a sidewall 620. The bottom plate 610 receives the optical member 320 thereon. Moreover, the sidewall 620 extends from the bottom plate 610 and together with the bottom plate 610 forms a receiving space SP for receiving the optical member 320 therein. The receiving container 600 may further receive the display panel 200 with the optical member 320 in the receiving space SP. In addition, the receiving container 600 forms a rectangular receiving space SP as illustrated, but example embodiments of the present invention are not limited thereto and thus the design and shape of the receiving space SP may be varied. The receiving container 600 may be made of, for example, a metal material with high thermal conductivity to dissipate the heat transferred from the light source module 500. For example, in an exemplary embodiment, the receiving container 600 is made of highly thermal conductive material such as aluminum (Al), Stainless Steel or Steel, Electrogalvanized, Cold Rolled, Coil (SECC).

Figure 2A:
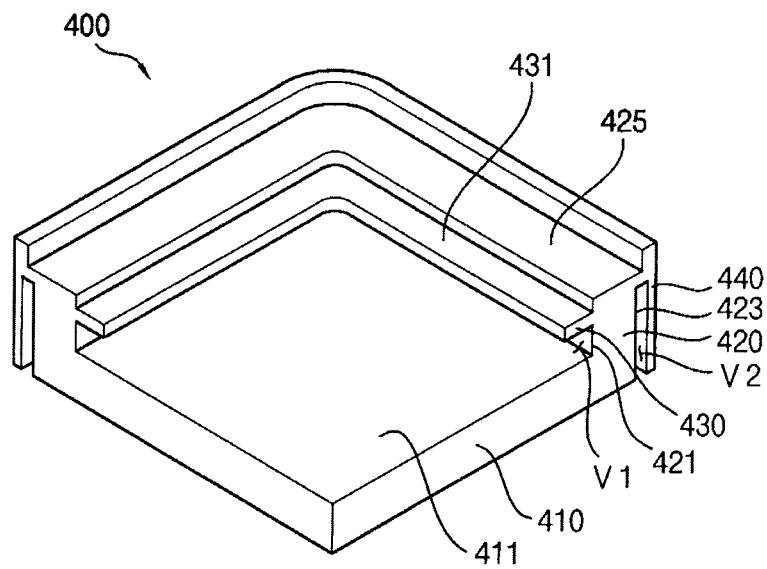
FIGS. 2A and 2B are perspective views illustrating the combining member of FIG. 1.
Figure 2B:
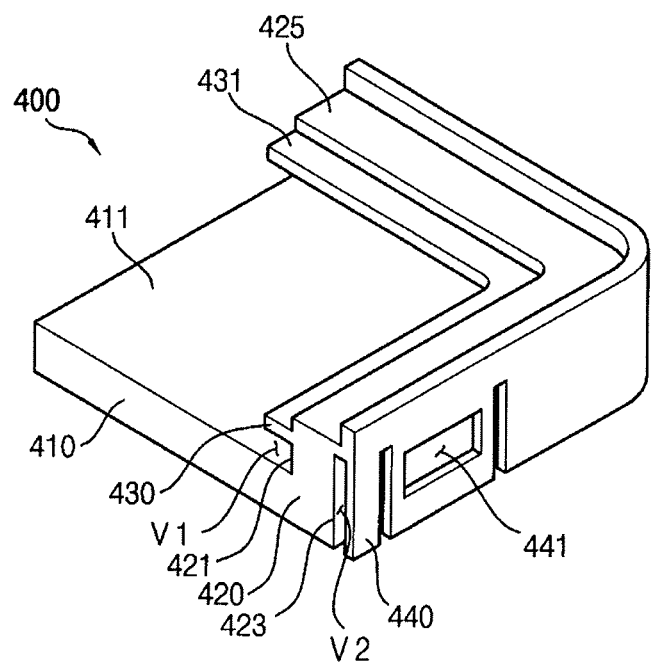

FIGS. 2A and 2B are perspective views illustrating the combining member of FIG. 1.

Referring to FIGS. 2A and 2B, the combining member 400 includes, for example, a first frame 410, a second frame 420, a third frame 430, and a fourth frame 440. The combining member 400 may be, for example, bent in L-shape to guide a corner of the optical member 320. A bent corner of the combining member 400 may have, for example, a round-shape.

The first frame 410, for example, partially covers the bottom surface 325 of the optical member 320. The second frame 420 protrudes upwards from the first frame 410. The third frame 430 protrudes from an inner surface 421 of the second frame 420 to, for example, partially cover the upper surface 323 of the optical member 320. The fourth frame 440 protrudes from the outer surface 423 of the second frame 420 to be combined with the sidewall 620 of the receiving container 600, and the outer surface 423 of the second frame 420 is opposite to the inner surface 421 of the second frame 420.

The optical member 320 may be inserted into a first space V1 between the first frame 410 and the third frame 430, and the sidewall 620 of the receiving container 600 may be inserted into a second space V2 between the second frame 420 and the fourth frame 440. The first space V1 includes, for example, a pair of the opposing first and third frames 410, 430 to grasp edges of optical member 320. The second space V2 is defined between the second frame 420 and the fourth frame 440. The sidewall 620 of the receiving container 600 is inserted into the second space V2 defined between the second frame 420 and the fourth frame 440. In addition, the fourth frame 440 protrudes from the second frame 420 and is bent in, for example, an L-shape.

With the optical sheet 310 integrated with the optical member 320, the optical member 320 may be inserted into the first space V1 between the first frame 410 and the third frame 430. When the optical sheet 310 is spaced apart a little from the optical member 320, damages to the optical sheet 310 which may be caused by friction generated by the optical member 320 may be reduced. For example, in an example embodiment, the optical member 320 is inserted into the first space V1 and the optical sheet 310 is arranged on an upper surface 431 of the third frame 430.

An upper surface 411 of the first frame 410 has, for example, a greater size than an upper surface 431 of the third frame 430 when viewed in a plan view. In other words, the first frame 410 may be formed to cover a larger area than the third frames 430. When widely formed, the third frame 430 is located between the optical member 320 and the optical sheet 310 or the display panel 200 so that a range of light may be narrowed. Also, the first frame 410 covers the bottom surface 325 of the optical member 320 and thus the surface of the first frame 410 covering the bottom surface 325 of the optical member 320 should be as wide as possible to strengthen a combination with the optical member 320.

The optical sheet 310 may be arranged on the upper surface 431 of the third frame 430, and the display panel 200 may be arranged on an upper surface 425 of the second frame 420. The upper surface 431 of the third frame 430 is formed opposite to a bottom surface of the third frame 430 which covers the optical member 320. In order words, a side of the third frame 430 is in contact with the upper surface 323 of the optical member 320, and an opposite side of the third frame 430 is in contact with the optical sheet 310. At this time, the optical member 320 is spaced apart from the optical sheet 310 up to vertical-thickness.

The upper surface 431 of the third frame 430 and the upper surface 425 of the second frame 420 have, for example, a difference in height. For example, optical sheet 310 is arranged on the upper surface 431 of the third frame 430 with a certain thickness, and the difference is formed at least as thick as the optical sheet 310 so that edges of the optical sheet 310 are guided, and the display panel 200 may be arranged on the upper surface 425 of the second frame 420 without a gap.

Alternatively, for example, in an example embodiment, when the optical sheet 310 is integrated with the optical member 320, the upper surface 431 of the third frame 430 and the upper surface 425 of the second frame 420 do not have a difference in height from each other and may be included in a plane.

In the present exemplary embodiment, the fourth frame 440, for example, protrudes from the outer surface 423 of the second frame 420, and is bent downwards to be substantially parallel with the second frame 420. In other words, due to the second space V2, the fourth frame 440 is formed, for example, having an opened shape and the sidewall 620 is inserted into the second space V2. The fourth frame 440 constitutes a bottom portion of the combining member 400 which is opened toward the sidewall 620 of the receiving container 600.

For example, the sidewall 620 of the receiving container 600 may comprise a boss 630 (See FIG. 3A) and the fourth frame 440 of the combining member 400 may include a recess 441. The recess 441 is combined with the boss 630. The optical member 320 is inserted horizontally into the combining member 400 and the boss 630 of the sidewall 620 is inserted into the recess 441 of the fourth frame 440 horizontally. In other words, the recess 441 may be formed in an outside-wall of the fourth frame 440 to be parallel with the sidewall 620, and the recess 441 is combined with the sidewall 620. A structure in which the recess 441 and the sidewall 620 have been combined with each other is explained in detail below.

It is noted that use of the fourth frame 440 is optional. For example, alternatively, in an example embodiment, the bottom surface of the first frame 410 of the combining member 400 may be attached to the receiving container 600 using, for example, a double-sided tape without the fourth frame 440.

Thus, the optical member 320 is guided to be inserted into the combining member 400 horizontally, and the optical sheet 310 and the display panel 200 are guided to be arranged on the upper surface of the combining member 400 frame. The receiving container 600 is vertically inserted into the combining member 400 so that components of the display apparatus 1000 may be assembled into a complete body by the combining member 400. The combining member 400 acts as a light guide plate fixture, a mold frame and a panel guide so that the display apparatus 1000 may be assembled simply and stably without a fixing member or a guiding member.

As a result of the display apparatus 1000 using a single combining member to combine part-to-part components of the display apparatus 1000, the number of total assembled parts may be decreased and a combination of components may be simplified so that the number of the assembly processes and assembly time may be reduced. Thus, manufacturing expenses may be reduced and productivity may be increased. In addition, the number of total assembled parts is decreased so that the display apparatus 1000 is lighter and slimmer.

Figure 3A:
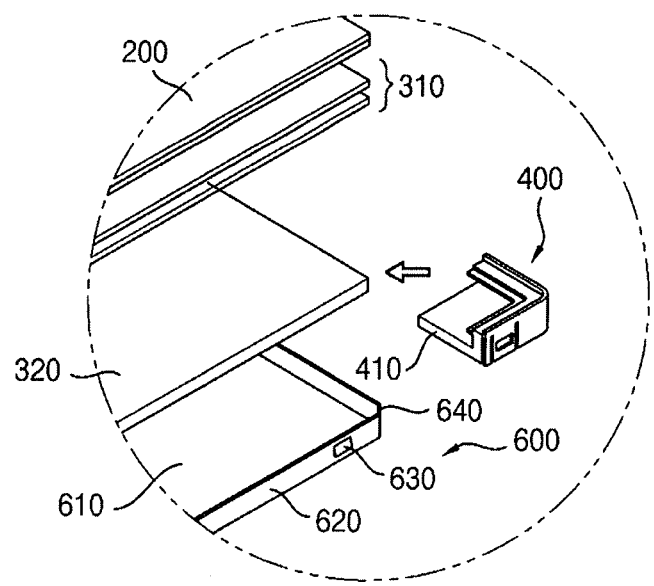
FIGS. 3A and 3B are perspective views illustrating a method of assembling the display apparatus using the combining member of FIGS. 2A and 2B.
Figure 3B:
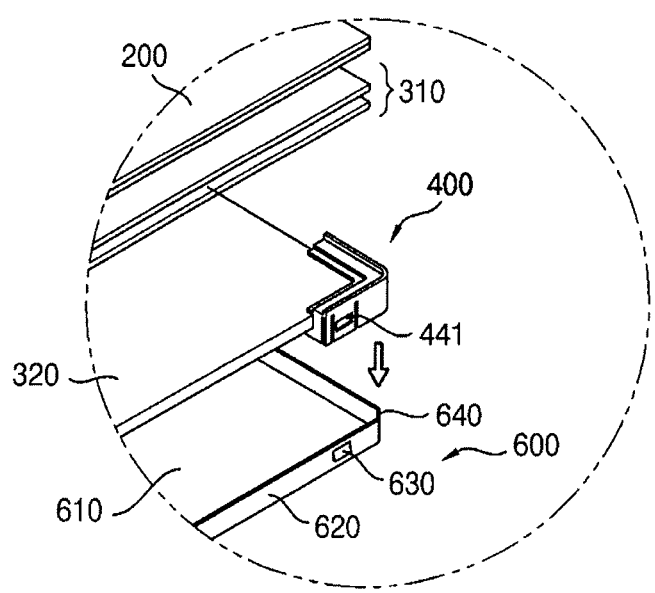

FIGS. 3A and 3B are perspective views illustrating a method of assembling the display apparatus of FIG. 1 using the combining member of FIGS. 2A and 2B.

Referring to FIGS. 3A and 3B, the display apparatus 1000 includes sequentially in this order, for example, the optical member 320 laminated with the optical sheet 310 and the display panel 200 disposed on the optical sheet 310 with a certain space therebetween. In the method of assembling the display apparatus 1000, first of all, edges of the optical member 320 are inserted into the containing member 400. The optical member 320 may be horizontally inserted into the first space V1 between the first frame 410 and the third frame 430 of the combining member 400 such that the combining member 400 is combined with a side of the optical member 320.

Next, the sidewall 620 of the receiving container 600 is inserted into the second space V2 between the second frame 420 and the fourth frame 440. A plurality of the combining members 400 is in a combined state with the edges of the optical member 320. In addition, the combining member 400 may be vertically assembled by inserting the sidewall 620 of the receiving container 600 into the second space V2 between the second frame 420 and the fourth frame 440. Here, the boss 630 may be formed on the sidewall 620 of the receiving container 600 and the recess 441 may be formed in an outside-wall of the fourth frame 440 to be parallel with the sidewall 620 in correspondence with the boss 630. Thus, a secure combination between combining member 400 and receiving container 600 may be obtained.

Moreover, the bent part of the sidewall 620 of the receiving container 600 may be, for example, chamfered, and the chamfered part of the sidewall 620 is located in a corner area 640 of the receiving container 600. In addition, a process of arranging the optical sheet 310 and the display panel 200 on the combining member 400 may be, for example, performed before or after a process of assembling combining member 400 with the sidewall 620 of the receiving container 600. After the optical member 320 and the receiving container 600 are combined by the combining member 400, the optical sheet 310 and the display panel 200 are arranged stably.

Figure 4:
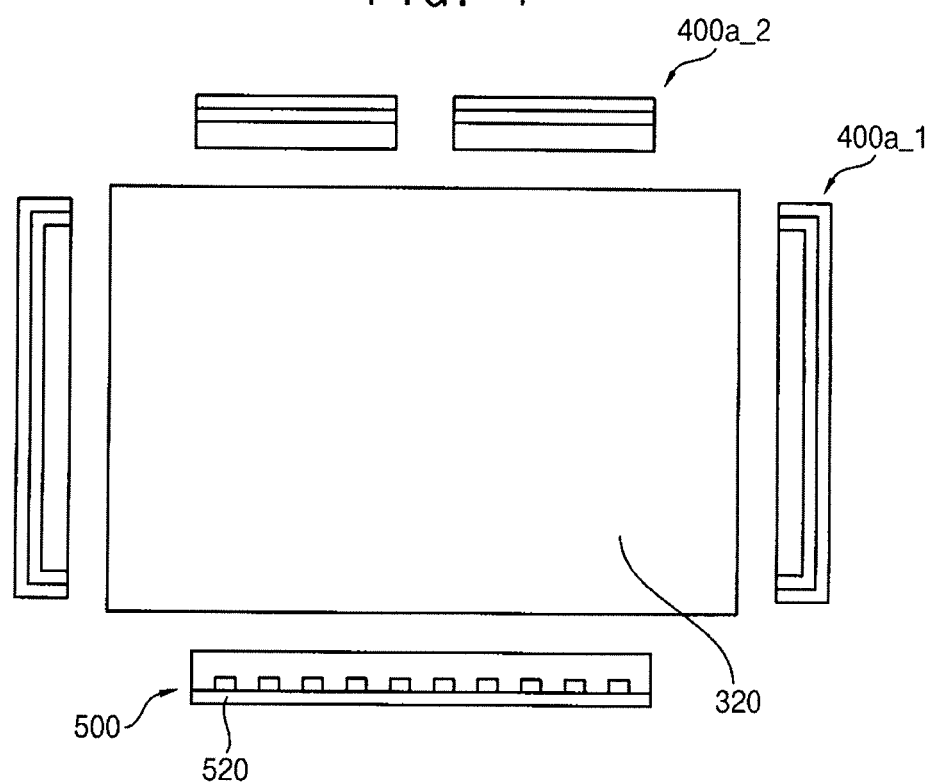
FIG. 4 is a plan view illustrating a combining member according to an example embodiment of the present invention.

FIG. 4 is a plan view illustrating a combining member according to an example embodiment of the present invention.

Referring to FIG. 4, combining members 400a_1, 400a_2 according to example embodiments of the present invention are plural in number and may be disposed around edges of the optical member 320. A display apparatus according to the present exemplary embodiment is substantially the same as the display apparatus of FIG. 1 except that combining members 400a_1, 400a_2 are fixed to the optical member 320. Thus, the same reference numerals will be used to refer to the same or like parts as those described for the display apparatus of FIG. 1 and any repetitive explanation concerning the above elements will be omitted.

A first combining member 400a_1 may be formed in, for example, a U-shape to cover an entire cross-section and opposing edges of optical member 320. The first combining member 400a_1 may be formed at opposing sides of the optical member 320. A second combining member 400b_1 may be formed straight along a long edge of the optical member 320. The length and the number of the second combining member 400a_2 may be controlled as needed. The first and second combining members 400a_1 and 400a_2 are substantially the same as a cross section of the combining member 400 of the display apparatus of FIG. 1 except for the shape in a plan view.

In the area, in which the light source module 500 is disposed along an edge of the optical member 320, the combining members 400a_1, 400a_2 may not be disposed in that area. Alternatively, the width of the second space may be formed to be increased. Accordingly, both of the sidewall 620 of the receiving container 600 and the supporting substrate 520 of the light source module 500 may be inserted into the second space having the increased width.

Figure 5:
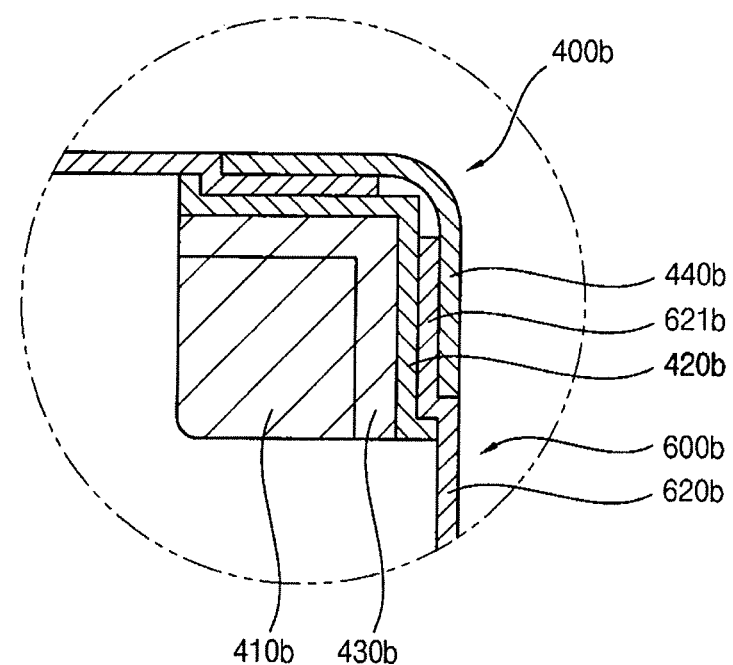
FIG. 5 is a cross-sectional view illustrating a combining member according to an example embodiment of the present invention.

FIG. 5 is a cross-sectional view illustrating a combining member according to an example embodiment of the present invention.

Referring to FIG. 5, a receiving container 600b may include a bottom plate (not illustrated) and a sidewall 620b. The sidewall 620b of the receiving container 600b may have a first sidewall 621b that is combined with a combining member 400b. The first sidewall 621b may be formed to be recessed inward the receiving space. A display apparatus according to the present exemplary embodiment is substantially the same as the display apparatus of FIG. 1 except for cross-sectional shapes of the sidewall 620b of the receiving container 600b and the combining member 400b. Thus, the same reference numerals will be used to refer to the same or like elements as those described for the display apparatus of FIG. 1 and any repetitive explanation concerning the above elements will be omitted.

For example, the first sidewall 621b may be formed in step-shape inward the receiving space. The first sidewall 621b may be inserted into part of the second space V2 between the second frame 420b and the fourth frame 440b of the combining member 440b, and the first sidewall 621b is bent as thick as the outside-wall of the fourth frame 400b. The fourth frame 440b of the combining member 400b may be formed to cover a bent part of the first sidewall 621b.

Thus, an outer surface of the combining member 400b exposed to the outside is smoothly connected with an outer surface of the sidewall 620b of the receiving container 600b without protrusions.

Having described example embodiments of the present invention, it is further noted that it is readily apparent to those of ordinary skill in the art that various modifications may be made without departing from the spirit and scope of the invention which is defined by the metes and bounds of the appended claims.

What is claimed is:

1. A backlight assembly comprising:
   an optical member configured to change optical characteristics of light;
   a receiving container including:
      a bottom plate disposed under the optical member and configured to receive the optical member thereon; and
      a sidewall extending from the bottom plate to form a receiving space with the bottom plate, wherein the optical member is received in the receiving space; and
   a combining member including:
      a first frame partially covering a bottom surface of the optical member;
      a second frame protruding upwards from the first frame;
      a third frame protruding from an inner surface of the second frame, the inner surface of the second frame facing the receiving space, to partially cover an upper surface of the optical member; and
      a fourth frame protruding from an outer surface of the second frame, the outer surface of the second frame facing away from the receiving space, the fourth frame bending downward to be substantially parallel with the second frame,
   wherein the first frame of the combining member is substantially planar, the optical member is substantially planar and parallel to the first frame, and the second frame protrudes in a direction normal to the planes of the first frame and the optical member.

2. The backlight assembly of claim 1, further comprising at least one optical sheet disposed on the optical member.

3. The backlight assembly of claim 2, wherein the optical sheet is disposed on an upper surface of the third frame.

4. The backlight assembly of claim 3, wherein an upper surface of the first frame has greater size than a size of the upper surface of the third frame when viewed in a plan view.

5. The backlight assembly of claim 1, further comprising a plurality of the combining members disposed around edges of the optical member.

6. The backlight assembly of claim 1, wherein part of the sidewall of the receiving container is chamfered, and wherein the chamfered part of the sidewall of the receiving container is located in a corner area of the receiving container.

7. The backlight assembly of claim 1, wherein a portion of the sidewall of the receiving container recesses toward the receiving space, and wherein the portion of the sidewall of the receiving container is combined with the combining member.

8. The backlight assembly of claim 1, further comprising a light source module including a plurality of incident light sources, wherein the light source module is disposed on a side of the optical member.

9. A backlight assembly comprising:
an optical member configured to change optical characteristics of light;
a receiving container including:
a bottom plate disposed under the optical member and configured to receive the optical member thereon; and
a sidewall extending from the bottom plate to form a receiving space with the bottom plate, wherein the optical member is received in the receiving space; and
a combining member including:
a first frame partially covering a bottom surface of the optical member; a second frame protruding upwards from the first frame;
a third frame protruding from an inner surface of the second frame, the inner surface of the second frame facing the receiving space, to partially cover an upper surface of the optical member; and
a fourth frame protruding from an outer surface of the second frame, the outer surface of the second frame facing away from the receiving space, and bending downward to be substantially parallel with the second frame,
wherein the fourth frame protruding from the outer surface of the second frame is configured to be combined with the sidewall of the receiving container.

10. The backlight assembly of claim 9, wherein the sidewall of the receiving container comprises a boss and the fourth frame of the combining member includes a recess, and wherein the recess is combined with the boss of the sidewall of the receiving container.

11. The backlight assembly of claim 10, wherein the optical member is disposed in a first space between the first frame and third frame, and wherein the sidewall of the receiving container is disposed in a second space between the second frame and the fourth frame.

12. A display apparatus comprising:
a display panel configured to display an image;
an optical member configured to change optical characteristics of light provided to the display panel;
a receiving container including:
a bottom plate disposed under the optical member and configured to receive the optical member thereon; and
a sidewall extending from the bottom plate to form a receiving space with the bottom plate, wherein the optical member is received in the receiving space; and
a combining member including:
a first frame covering partially a bottom surface of the optical member;
a second frame protruding upwards from the first frame;
a third frame protruding from an inner surface of the second frame, the inner surface of the second frame facing the receiving space, to cover partially an upper surface of the optical member; and
a fourth frame protruding from an outer surface of the second frame, the outer surface of the second frame facing away from the receiving space, the fourth frame bending downward to be substantially parallel with the second frame,
wherein the first frame of the combining member is substantially planar, the optical member is substantially planar and parallel to the first frame, and the second frame protrudes in a direction normal to the planes of the first frame and the optical member.

13. The display apparatus of claim 12, further comprising at least one optical sheet disposed on the optical member.

14. The display apparatus of claim 13, wherein the optical sheet is disposed on an upper surface of third frame.

15. The display apparatus of claim 14, wherein an upper surface of the first frame has a greater size than a size of the upper surface of the third frame when viewed in a plan view.

16. A display apparatus comprising:
a display panel configured to display an image;
an optical member configured to change optical characteristics of light provided to the display panel;
a receiving container including:
a bottom plate disposed under the optical member and configured to receive the optical member thereon; and
a sidewall extending from the bottom plate to form a receiving space with the bottom plate, wherein the optical member is received in the receiving space; and
a combining member including:
a first frame covering partially a bottom surface of the optical member;
a second frame protruding upwards from the first frame;
a third frame protruding from an inner surface of the second frame, the inner surface of the second frame facing the receiving space, to cover partially an upper surface of the optical member; and
a fourth frame protruding from an outer surface of the second frame, the outer surface of the second frame facing away from the receiving space, the fourth frame bending downward to be substantially parallel with the second frame,
wherein the fourth frame protruding from an outer surface of the second frame is configured to be combined with the sidewall of the receiving container.

17. The display apparatus of claim 16, wherein the sidewall of the receiving container comprises a boss and the fourth frame of the combining member includes a recess, and wherein the recess is combined with the boss of the sidewall of the receiving container.

18. The display apparatus of claim 17, wherein the optical member is disposed in a first space between the first frame and third frame, and wherein the sidewall of the receiving container is disposed in a second space between the second frame and fourth frame.

19. A display apparatus comprising:
an optical member having a light incident surface, wherein the optical member is configured to change optical characteristics of light;
an optical sheet disposed on an upper surface of the optical member;
a display panel configured to display an image and disposed on an upper surface of the optical sheet, wherein the display panel includes an upper substrate, a lower substrate opposite to the upper substrate and a liquid crystal layer disposed between the lower substrate and the upper substrate;
a receiving container including:
a bottom plate disposed under the optical member and configured to receive the optical member thereon; and a sidewall extending from the bottom plate to form a receiving space with the bottom plate, wherein the optical member is received in the receiving space; and a combining member including:

a first frame;

a second frame protruding upwards from the first frame;

a third frame protruding from an inner surface of the second frame to partially overlap with an upper surface of the first frame to thereby define a first space between an upper surface of the first frame and a lower surface of the third frame, wherein the optical member is received in the first space and wherein the third frame partially covers the optical member disposed in the first space, wherein the first frame of the combining member is substantially planar, the optical member is substantially planar and parallel to the first frame, and the second frame protrudes in a direction normal to the planes of the first frame and the optical member; and a fourth frame protruding from an outer surface of the second frame and bending downward to be substantially parallel with the second frame to thereby define a second space between the outer surface of the second frame and an inner surface of the fourth frame, wherein the sidewall of the receiving container is received in the second space, wherein the fourth frame includes a recess disposed in an outside wall of the fourth frame substantially parallel with the sidewall of the receiving container and the recess is configured to be combined with the sidewall of the receiving container, and wherein the outer surface of the second frame is opposite to the inner surface of the second frame; and a light source module including a supporting substrate and a plurality of incident light sources disposed on the supporting substrate, wherein the light source module is disposed on a side of the optical member.

20. The display apparatus of claim 19, further comprising a reflective sheet disposed under the optical member in the receiving space of the receiving container.

21. The display apparatus of claim 19, wherein the optical sheet includes a diffusion sheet and a prism sheet disposed on the diffusion sheet.

22. The display apparatus of claim 19, wherein the optical member is a light guide plate and wherein the optical member includes one of poly methacrylate (PMMA) or polycarbonate (PC).

23. The display apparatus of claim 19, wherein the light incident sources are mounted on the supporting substrate of the light source module opposite to the light incident surface of the optical member.

24. The display apparatus of claim 23, wherein the light incident sources include light emitting diodes (LEDs).

25. The display apparatus of claim 24, wherein the light incident sources include at least one red LED emitting a red light, at least one green LED light emitting a green light, and at least one blue LED emitting a blue light.

26. The display apparatus of claim 19, wherein the fourth frame protruding from the outer surface of the second frame bends in an L-shape.

27. The display apparatus of claim 19, wherein an upper surface of the third frame and an upper surface of the second frame have different heights from each other.

28. The display apparatus of claim 19, wherein the sidewall of the receiving container is concavely disposed toward the receiving space, and is disposed in the second space located between the outer surface of the second frame and the inner surface of the fourth frame, wherein the sidewall of the receiving container bends as thick as the outside wall of the fourth frame and wherein the fourth frame of the combining member covers a bent part of the sidewall of the receiving container.

* * * * *